| (12) United States Patent | (10) Patent No.: US 7,445,849 B2 |
| Apitz et al. | (45) Date of Patent: Nov. 4, 2008 |

(54) CONCRETE MOLDINGS WITH A HIGH GLOSS, THEIR PRODUCTION AND USE

(75) Inventors: Gregor Apitz, Eppstein (DE); Helga Machnik, Schmitten (DE); Hans W. Kremer, Brechen (DE); Stephan Krieger, Hofheim (DE); Klaudia Knell, Mömbris (DE)

(73) Assignee: Celanese Emulsions GmbH (DE)

( * ) Notice: Subject to any disclaimer, the term of this patent is extended or adjusted under 35 U.S.C. 154(b) by 201 days.

(21) Appl. No.: 10/945,138

(22) Filed: Sep. 20, 2004

(65) Prior Publication Data

US 2005/0064249 A1      Mar. 24, 2005

(30) Foreign Application Priority Data

Sep. 22, 2003   (DE)   ................. 103 43 726

(51) Int. Cl.
*B32B 13/12* (2006.01)
(52) U.S. Cl. .................. 428/451; 428/699; 428/701; 428/702; 428/703; 524/460
(58) Field of Classification Search ................ 428/699, 428/701, 702, 703, 451
See application file for complete search history.

(56) References Cited

U.S. PATENT DOCUMENTS

| 4,177,232 | A | * | 12/1979 | Day ............................ 264/133 |
| 5,047,295 | A | | 9/1991 | Dotzauer et al. |
| 5,133,997 | A | | 7/1992 | Maier et al. |
| 5,215,827 | A | | 6/1993 | Dotzauer et al. |
| 5,356,968 | A | * | 10/1994 | Rupaner et al. ............. 524/157 |
| 6,136,383 | A | | 10/2000 | Schwartz et al. |
| 6,423,382 | B1 | | 7/2002 | Bowe et al. |
| 6,475,632 | B1 | | 11/2002 | Krieger et al. |
| 6,531,179 | B2 | | 3/2003 | Schwartz et al. |
| 6,709,710 | B2 | | 3/2004 | Krieger et al. |
| 2005/0064249 | A1 | | 3/2005 | Apitz et al. |

FOREIGN PATENT DOCUMENTS

| DE | 39 32 573 | 4/1991 |
| DE | 3932573 | 4/1991 |
| DE | 198 12 143 | 9/1999 |
| DE | 19812143 | 9/1999 |
| DE | 100 18 469 | 1/2002 |
| DE | 69903117 | 7/2003 |
| DE | 10343726 | 5/2005 |
| EP | 0 383 002 | 8/1990 |
| EP | 0 469 295 | 2/1992 |
| EP | 0 492 210 | 7/1992 |
| EP | 0 754 663 | 1/1997 |
| EP | 0 894 780 | 2/1999 |
| EP | 1 006 094 | 6/2000 |
| EP | 1 114 806 | 7/2001 |
| GB | 2 030 890 | 4/1980 |
| GB | 2030890 | 4/1980 |
| WO | WO-99/48841 | 9/1999 |

* cited by examiner

*Primary Examiner*—D. S Nakarani
(74) *Attorney, Agent, or Firm*—Connolly Bove Lodge & Hutz LLP

(57) ABSTRACT

A description is given of a concrete molding which is coated with cement-bound mineral coating composition (cement slurry) and with a transparent varnish, the transparent varnish comprising as binder an aqueous polymer dispersion and also at least one anionic emulsifier containing at least one phosphate and/or phosphonate group.

The concrete molding is distinguished by high gloss and can be used in particular as rooftile.

16 Claims, No Drawings

CONCRETE MOLDINGS WITH A HIGH GLOSS, THEIR PRODUCTION AND USE

The present invention relates to the production of glossy transparent coatings on concrete moldings and to the use of the moldings as building materials.

In the production of concrete moldings, such as concrete rooftiles, a pasty mortar compound is shaped and then generally before curing or setting is protected against lime efflorescence, and decorated, by coating with a paint or varnish. Subsequent curing or setting of the concrete moldings then takes place together with the drying of the coating at elevated temperatures: in the case of concrete rooftiles at temperatures in the range between 40 to 100° C. Since lime efflorescence is formed even as the cement sets it is important to apply the coating as efflorescence protection even to the as yet uncured concrete, referred to as green concrete. Curing or setting may be followed if desired by a second or further coating with a paint or clear varnish, with subsequent drying in each case.

Coating can be achieved using not only aqueous but also solvent-based coating systems, preference now being given on environmental grounds to aqueous systems.

Using aqueous coating systems typically comprising an aqueous polymer dispersion binder to coat concrete rooftiles it is possible through an appropriate choice of polymer dispersion to exert a targeted influence on the properties of said coating systems (e.g., stability, efflorescence protection, propensity to algal fouling, and soil pickup behavior).

The use of dispersions based on (meth)acrylic esters and/or styrene for preparing rooftile paints is already known from DD-A124,808.

EP-A-492,210 describes the use of selected copolymers derived from specific monomers to reduce the soil pickup propensity of concrete rooftiles.

EP-A-383,002 discloses concrete rooftiles coated with paints based on organotin copolymer dispersions and having only low propensity to algal fouling.

EP-A-894,780 describes the use of radiation-curable formulations to coat mineral moldings with the aim among others of enhancing the efflorescence protection, bringing with it the disadvantage of an increased technical complexity and increased costs.

EP-B-754,663 describes a method of producing efflorescence-resistant coatings on cementlike substrates in which a coating is applied using a selected latex binder together with a foam agent to a cementlike substrate and the resultant foam is subsequently collapsed. The latex is prepared by emulsion polymerization using usual nonionic, anionic or cationic emulsifiers. Examples listed of anionic emulsifiers include alkali metal or ammonium alkyl sulfates, alkylsulfonic acids, alkylphosphonic acids, fatty acids, and oxyethylated alkylphenol sulfates and phosphates.

With the aim of reducing lime efflorescence EP-A-469-295 describes coating concrete blocks with films of selected copolymers containing selected emulsifiers based on sulfonated diaryl ethers.

WO-A-99/48841 describes the use of carboxymethylcellulose as a protective colloid for preparing dispersions with sufficient stability and effective efflorescence protection for the coating of rooftiles. The dispersions are prepared by emulsion polymerization using usual nonionic or ionic emulsifiers. Examples listed of anionic emulsifiers include alkali metal or ammonium salts of alkyl-, aryl- or aralkylsulfonates or -phosphonates and alkyl, aryl or aralkyl sulfates or phosphates, or compounds having other anionic endgroups.

DE-C-100 18 469 discloses how by adding aqueous styrene-maleic anhydride copolymer solutions to dispersions the efflorescence protection of corresponding dispersion rooftile paints is improved. The dispersions are prepared by emulsion polymerization using usual nonionic or ionic emulsifiers. Examples listed of anionic emulsifiers include alkali metal or ammonium salts of alkyl-, aryl- or aralkylsulfonates or -phosphonates and alkyl, aryl or aralkyl sulfates or phosphates, or compounds having other anionic endgroups.

For the coloring of concrete moldings, especially concrete rooftiles, it is also possible to use a cement-bound mineral coating composition (known as a cement slurry). This composition is composed essentially of cement, water and pigments plus if desired very fine sands. This coating composition, immediately following its application to the concrete molding and prior to curing or setting, is coated with a transparent varnish. The varnish in this case has the task of preventing lime efflorescence and enhancing the weathering stability. The transparent varnish applied in this process greatly influences the gloss of the cured concrete molding.

DE-C-39 32 573 describes rooftiles consisting of a concrete body and a second cementitious mineral layer applied by rolling or extrusion. The coating applied in this document comprises known surface coatings composed of a polymer dispersion with extender pigments and additives.

GB-A-20 30 890 describes another concrete molding composed of a concrete body, a second cementitious mineral layer, and a coating applied thereon. The coating described in the example comprises quartz as filler.

DE-A-198 12 142 does disclose the possibility of using phosphate-containing emulsifiers in the preparation of dispersions as binders for rooftile paints. That document does not reveal, however, that these dispersions are also suitable for formulating clear varnishes. The dispersions described therein comprise cellulose ether derivatives as protective colloids. Such dispersions are assumed to have a very broad particle size distribution, so that the skilled worker would have tended not to use them as a component for formulating transparent coatings.

The rooftile paints or clear varnishes usually used for coating concrete moldings, based on aqueous polymer dispersions, do lead to adequate efflorescence protection or to an acceptably low soil pickup propensity, but in the context of the coating of colored, cement-bound, mineral coating compositions give only very matt surfaces after the curing and drying of the clear varnish.

Starting out from this state of the art, the object of the present invention is to provide a coated concrete molding which is distinguished by effective efflorescence protection and by improved gloss.

A further object of the present invention is to provide a simple and economic process for producing colored concrete moldings with high gloss and a low propensity to effloresce.

It has now surprisingly been found that cement-slurry-coated concrete moldings can be colored by a coating of selected coating materials and that when this is done the cured concrete moldings have glossy surfaces.

The present invention provides a concrete molding which has been coated with cement-bound mineral coating composition (cement slurry) and with a transparent varnish, the transparent varnish comprising as binder an aqueous polymer dispersion comprising at least one anionic emulsifier containing at least one phosphate and/or phosphonate group.

The invention further provides a process for producing the glossy concrete molding described above, such as concrete rooftiles, which comprises:

a) producing a molding from as yet uncured cement-bound mineral molding compound, b) coating at least one surface of the molding produced in step a) with uncolored or colored cement-bound mineral coating composition (cement slurry), c) coating the cement-slurry-coated surface(s) of the as yet uncured cement-bound mineral molding compound with a transparent aqueous varnish comprising an aqueous polymer dispersion binder stabilized with anionic emulsifiers containing at least one phosphate and/or phosphonate group, and d) curing the molding and the coats of cement slurry and transparent varnish in conventional manner.

The glossy concrete moldings of the invention additionally possess good protection against lime efflorescence and a good weathering stability.

The term "concrete moldings" comprehends shaped structures of concrete, including aerated concrete, examples being slabs, pipes and, in particular, rooftiles. The concrete moldings can be produced in conventional manner from ready-mixed concrete, by means for example of extrusion techniques. As a result they acquire their ultimate shape even at this stage.

Cement slurries are normally prepared in a stirred vessel from cement, sand, water and, where appropriate, pigment and, if desired, further additions, such as plasticizers or dispersions, as described in EP-A-1,114,806. The cement slurry is applied by conventional techniques. Generally speaking, the cement slurry is applied by brushing to the concrete moldings before they have set.

The aqueous varnish is likewise applied by conventional techniques to the cement-slurry-coated concrete moldings before they have set, immediately following the application of the cement slurry. It is applied preferably by spray application.

The aqueous varnish used in accordance with the invention is an aqueous transparent varnish (clear varnish). This varnish is a preferably pigment-free and/or filler-free coating material. Small fractions of pigments and/or fillers are possible provided they do not detract from the transparency of the varnish. The use of transparent fillers is a further possibility.

The concrete moldings produced in this way are subsequently cured. Typical curing temperatures are in the range from 20 to 100° C., preferably from 40 to 80° C. At these temperatures not only the concrete molding but also the cement slurry coating cure. Additionally the applied transparent varnish dries.

The dispersions used to produce the coated concrete moldings of the invention typically possess a minimum film formation temperature in the range from 0 to 80° C., preferably in the range from 0 to 50° C. and in particular in the range from 0 to 30° C., and are prepared by emulsion polymerization using anionic emulsifiers containing phosphate and/or phosphonate groups. It is also possible to add further emulsifier after the end of the polymerization.

Phosphate-functional emulsifiers used with preference are esters of phosphoric acid with alcohols and phenols (also in the form of mixtures of mono-, di- and triesters of phosphoric acid), esters of phosphoric acid with adducts of alcohols and/or (alkyl)phenols and ethylene oxide and/or propylene oxide and the sodium, potassium and ammonium salts of these compounds. Compounds of this kind are available commercially for example under the tradename ®Berol 522 (potassium alkyl phosphate), ®Hostaphat 1306 (alkyl oligoethoxylate phosphate) and ®Berol 733 (potassium alkylphenol oligoethoxylate phosphate).

As phosphate-functional emulsifiers it is also possible to use ethylenically unsaturated esters of phosphoric acid with hydrocarbons and the neutralization products derived therefrom, with bases, as copolymerizable emulsifiers. As will be appreciated, mixtures of the aforementioned emulsifiers can also be used.

Particular suitability as anionic emulsifiers containing phosphate and/or phosphonate groups is possessed by copolymerizable modified alcohol ether phosphates, such as Maxemul® 6106, 6112 and 6120 from Unichema, the alkali metal or ammonium salts of linear $C_8$-$C_{12}$ alkylphosphonic acids (Hostaphat OPS, Clariant), alkali metal or ammonium salts of linear and branched $C_{10}$-$C_{18}$ alkyl polyglycol ether phosphates (Hostaphat K, Clariant), alkylaryl polyglycol ether phosphates (Berol 733) and also the alkali metal or ammonium salts of linear or branched $C_{10}$-$C_{18}$ alkylphosphoric monoesters and diesters (Hostaphat C, Clariant, Berol 521 and 522) and also all mixtures of the aforementioned emulsifiers.

The last-mentioned group of emulsifiers is used with preference in accordance with the invention.

Likewise used with preference are monoesters of phosphoric acid.

The aqueous polymer dispersion ought to contain 0.2-5% by weight, preferably 0.4-3% by weight, and more preferably 0.5-2% by weight of the phosphorus compounds used in accordance with the invention, based on the amount of polymer in the dispersion, as anionic emulsifiers.

The dispersion may further comprise other nonionic or additional anionic emulsifiers.

As nonionic emulsifiers use is made for example of alcohol polyglycol ethers such as ethoxylation products of lauryl, oleyl or stearyl alcohol or of mixtures such as coconut fatty alcohol; alkylphenol polyglycol ethers, such as ethoxylation products of octyl- or nonylphenol, diisopropylphenol, triisopropylphenol or of di- or tri-tert-butylphenol; or ethoxylation products of polypropylene oxide.

Additional anionic emulsifiers which can be used include the alkali metal or ammonium salts of alkyl-, aryl- or alkylarylsulfonates and alkyl, aryl or alkyl sulfates, in which there may also be oligo- or polyethylene oxide units located between the hydrocarbon radical and the anionic group. Typical examples are sodium lauryl sulfate, sodium undecyl glycol ether sulfate, sodium lauryl diglycol sulfate, sodium tetradecyl triglycol sulfate, sodium octylphenol glycol ether sulfate, sodium dodecylbenzenesulfonate, sodium lauryl diglycol sulfate, and ammonium tri-tert-butylphenol pentaglycol or octaglycol sulfate. Also possible is the use of sulfonated diaryl ethers according to formula I of EP-A469,295.

It is preferred to use mixtures of anionic emulsifiers, combining at least one emulsifier containing a phosphate and/or phosphonate group with a further emulsifier containing a sulfate or sulfonate group as anionic group.

Particular preference is given to mixtures of emulsifiers with at least 10% by weight of an emulsifier containing phosphate and/or phosphonate groups, based on the total amount of emulsifier used.

To stabilize the aqueous polymer dispersions used in accordance with the invention it is also possible to use protective colloids as well, provided this does not significantly increase the particle diameters of the polymer dispersion. Typical average particle diameters ($D_{50}$ values) of the polymer dispersions used in accordance with the invention are in the region of less than or equal to 200 nm, preferably less than or equal to 150 nm.

Suitable protective colloids are the polyvinyl pyrrolidone-based copolymers, cellulose ether derivatives, as described for example in WO-A-99/48,841, and polyvinyl alcohols which are known to the skilled worker and are customarily used.

The aqueous polymer dispersions used to produce the concrete moldings of the invention are obtained by emulsion polymerization of free-radically polymerizable ethylenically unsaturated monomers, preferably of mixtures of such monomers.

These are preferably monomer mixtures comprising acrylates and/or methacrylates and/or vinylaromatics as principal monomers, particularly monomer mixtures having the following composition:

i) from 85 to 99.8% by weight of acrylic esters with $C_1$ to $C_{12}$ alkanols, methacrylic esters with $C_1$ to $C_{12}$ alkanols and/or vinyl aromatic monomers, ii) from 0.2 to 5% by weight of stabilizing monomers, such as copolymerizable carboxylic acids, copolymerizable carboxamides, copolymerizable phosphates and/or phosphonates, copolymerizable sulfates and/or copolymerizable sulfonic acids and salts thereof, and iii) from 0 to 10% by weight of other monomers.

Monomers i) used include acrylic and methacrylic esters of $C_1$ to $C_{12}$ monoalcohols, such as ethyl acrylate, butyl acrylate, n-octyl acrylate, 2-ethylhexyl acrylate, methyl methacrylate, butyl methacrylate, cyclohexyl methacrylate, isobornyl methacrylate, and/or vinylaromatic monomers such as styrene or vinyltoluene, for example.

It is preferred to use those combinations known to the skilled worker of softening monomers, such as butyl acrylate and 2-ethylhexyl acrylate, for example, with hardening monomers, such as methyl methacrylate, cyclohexyl methacrylate and styrene, for example, so that the minimum film formation temperature (MFFT) of the corresponding dispersion is in the range from 0 to 80° C., preferably from 0 to 50° C., in particular in the range from 0 to 30° C. and with very particular preference in the range from 0 to 20° C.

If the process of multistage emulsion polymerization is employed, then the hardening and softening monomers and the mass ratio of the individual polymerization stages are preferably combined in such a way that the dispersion possesses a minimum film formation temperature in the range from 0 to 80° C., preferably from 0 to 50° C., and the corresponding dispersion films possess a breaking elongation of >100% for a film thickness of 100 μm.

Stabilizing monomers ii) used include copolymerizable carboxylic acids and carboxamides, such as acrylic acid, methacrylic acid, itaconic acid, acrylamide, and methacrylamide, and/or copolymerizable sulfates and/or copolymerizable sulfonates, such as sodium ethenesulfonate, sulfoalkyl (meth)acrylates, e.g., potassium salt of sulfopropyl methacrylate (=SPM® from Raschig), sulfoalkyl(meth)acrylamides, e.g., the sodium salt of acrylamido-2-methylpropanesulfonic acid (=AMPS® from Lubrizol).

Also possible for use as monomers ii) are phosphates and/or phosphonates modified with free-radically polymerizable groups. Examples thereof are vinyl phosphonate or the abovementioned alcohol ether phosphates copolymerizably modified with phosphate and/or phosphonate groups.

As other monomers iii) it is possible to use monomers containing keto groups, such as acetoacetoxy-containing monomers, e.g., acetoacetoxyethyl methacrylate, acetoacetoxybutyl methacrylate, acrylamidomethylacetylacetone and vinyl acetoacetate, and polymerizable derivatives of diacetone, such as diacetoneacrylamide and diacetonemethacrylamide.

Further monomers iii) which can be used include hydroxyalkyl (meth)acrylates, glycidyl (meth)acrylates, alkoxyvinylsilanes, (meth)acryloyloxyalkylsilanes, (meth)acryloyloxyalkyl phosphates, and polymerizable ethyleneurea derivatives, such as N-(β-(meth)acryloyloxyethyl)-N,N'-ethyleneurea and N-(β-acrylamidoethyl)-N,N'-ethyleneurea.

In order to improve the soiling behavior it is possible, to dispersions containing monomers containing keto groups as other monomers iii), to add polyfunctional carboxylic hydrazides containing at least two hydrazide groups, such as adipic dihydrazide, oxalic dihydrazide, isophthalic dihydrazide and polyacrylic polyhydrazide, for example.

Preference is given to using an equimolar ratio of hydrazide groups to keto groups.

The polymerization of the aqueous polymer dispersions used in the process of the invention is carried out by the customary methods of emulsion polymerization, wherein the monomers are emulsified in aqueous phase in the presence of emulsifiers, initiators and/or the protective colloid and polymerized at temperatures of typically 50 to 95° C.

The emulsion polymerization can be carried out by the common methods known to the skilled worker, such as batch, monomer metering or emulsion feed methods.

It is preferred to operate by the emulsion feed method, where a small amount of the monomers is prepolymerized and subsequently the remaining amount of monomers is metered in as an aqueous emulsion.

If desired it is also possible to meter in two or more different monomer emulsions in succession.

In order to initiate and continue the polymerization use is made of oil-soluble and/or preferably water-soluble free-radical initiators or redox systems. Suitable examples include hydrogen peroxide, potassium, sodium or ammonium peroxodisulfate, dibenzoyl peroxide, lauryl peroxide, tert-butyl hydroperoxide, bisazodiisobutyronitrile, alone or together with reducing components, e.g., with sodium bisulfite, the salts of hydroxymethanesulfinic acid, glucose, ascorbic acid and other reducing compounds.

Preference is given to using peroxodisulfates.

Additionally it is possible to use regulators, such as mercaptans, in particular n-dodecyl mercaptan, thiophenol and 2-methyl-5-tert-butylthiophenol.

Normally amounts of from 0 to 1% by weight are used, preferably from 0 to 0.5% by weight, and with particular preference the dispersion is prepared without a regulator being used.

The aqueous polymer dispersions are normally adjusted with aqueous ammonia, alkali metal hydroxide and alkaline earth metal hydroxide solutions to a pH of from 6.5 to 10, preferably from 7.0 to 9.0. Also possible is the use of a buffer, such as sodium hydrogen phosphate, sodium acetate and sodium hydrogen carbonate, which if appropriate is added during the emulsion polymerization itself.

The aqueous polymer dispersions used as transparent varnish for producing the concrete moldings of the invention preferably comprise further additives and ingredients such as are conventional to the formulation of aqueous dispersion coating materials. As additives and further ingredients it is possible to use film-forming auxiliaries, such as white spirit, Texanol®, TxiB®, butyl glycol, butyl diglycol, butyl dipropylene glycol and butyl tripropylene glycol; plasticizers, such as dimethyl phthalate, diisobutyl phthalate, diisobutyl adipate, Coasol B® and Plastilit 3060®; wetting agents such as AMP 90®, TegoWet.280®, Fluowet PE®; thickeners based on polyacrylates or polyurethanes, such as Borchigel L75® and Tafigel PUR 60®; preservatives, defoamers, e.g., mineral oil defoamers or silicone defoamers; UV protectants such as Tinuvin 1130®, dispersants, such as polyacrylic acids (e.g., Lopon 890®) or styrene-maleic anhydride copolymers, as described for example in DE-C-100 184 69, or other additives and auxiliaries such as are customary to the formulation of coating compositions.

The concrete moldings of the invention can be used as building materials, particularly in the form of slabs or pipes and with especial preference as rooftiles.

These uses are likewise provided for by the present invention.

The examples below illustrate the invention without limiting it.

EXAMPLES

A) Preparation of Inventive Aqueous Polymer Dispersions

Example 1

Emulsifier solution 1: 28% strength by weight aqueous solution of the potassium salt of a $C_{10}$ alkyl phosphate.

A polymerization reactor was charged with 475 g of deionized water and 25 g of emulsifier solution 1 and this initial charge was heated with stirring to 80° C.

In a feed vessel a monomer emulsion was prepared from the following components with stirring (feed stream 1):

| Amount | Component |
| --- | --- |
| 645.00 g | deionized water |
| 2.89 g | sodium hydroxide |
| 15.00 g | 2-acrylamido-2-methyl-propanesulfonic acid |
| 2.50 g | ammonium persulfate |
| 17.86 g | emulsifier solution 1 |
| 500.00 g | methyl methacrylate |
| 500.00 g | butyl acrylate |

In a further feed vessel an aqueous initiator solution was prepared from the following components (feed stream 2):

| Amount | Component |
| --- | --- |
| 13.33 g | deionized water |
| 0.50 g | ammonium persulfate |

The initial charge heated at 80° C. in the polymerization reactor was admixed in succession and in one portion in each case with 60.00 g of feed stream 1 and all of feed stream 2 and this mixture was polymerized at 80° C. for 15 minutes. Thereafter the remainder of feed stream 1 was metered continuously into the reactor over the course of 180 minutes at a constant 80° C. Finally polymerization was continued at 80° C. for 60 minutes and the batch was then cooled to 25° C.

The solids content of the polymer dispersion obtained was 47.0%.

Example 2

Emulsifier solution 1: 28% strength by weight aqueous solution of the potassium salt of a $C_{10}$ alkyl phosphate.

Emulsifier solution 2: 28% strength by weight aqueous solution of the sodium salt of a sulfuric monoester of an ethoxylated $C_{11}$ alcohol, average degree of ethoxylation approximately 7.

A polymerization reactor was charged with 475 g of deionized water and 16.43 g of emulsifier solution 1 and 8.21 g of emulsifier solution 2 and this initial charge was heated with stirring to 80° C.

In a feed vessel a monomer emulsion was prepared from the following components with stirring (feed stream 1):

| Amount | Component |
| --- | --- |
| 644.00 g | deionized water |
| 2.89 g | sodium hydroxide |
| 15.00 g | 2-acrylamido-2-methyl-propanesulfonic acid |
| 2.50 g | ammonium persulfate |
| 14.29 g | emulsifier solution 1 |
| 7.14 g | emulsifier solution 2 |
| 500.00 g | methyl methacrylate |
| 500.00 g | butyl acrylate |

In a further feed vessel an aqueous initiator solution was prepared from the following components (feed stream 2):

| Amount | Component |
| --- | --- |
| 13.33 g | deionized water |
| 0.50 g | ammonium persulfate |

Reaction regime as in example 1.

The solids content of the aqueous polymer dispersion obtained was 47.0%.

Example 3

Emulsifier solution 1 and emulsifier solution 2: as example 2.

A polymerization reactor was charged with 475 g of deionized water and 12.50 g of emulsifier solution 1 and 12.50 g of emulsifier solution 2 and this initial charge was heated with stirring to 80° C.

In a feed vessel a monomer emulsion was prepared from the following components with stirring (feed stream 1):

| Amount | Component |
| --- | --- |
| 643.00 g | deionized water |
| 2.89 g | sodium hydroxide |
| 15.00 g | 2-acrylamido-2-methyl-propanesulfonic acid |
| 2.50 g | ammonium persulfate |
| 8.93 g | emulsifier solution 1 |
| 12.50 g | emulsifier solution 2 |
| 500.00 g | methyl methacrylate |
| 500.00 g | butyl acrylate |

In a further feed vessel an aqueous initiator solution was prepared from the following components (feed stream 2):

| Amount | Component |
| --- | --- |
| 13.33 g | deionized water |
| 0.50 g | ammonium persulfate |

Reaction regime as in example 1.

The solids content of the aqueous polymer dispersion obtained was 47.0%.

Example 4

Emulsifier solution 1 and emulsifier solution 2: as example 2.

A polymerization reactor was charged with 475 g of deionized water and 8.21 g of emulsifier solution 1 and 16.43 g of emulsifier solution 2 and this initial charge was heated with stirring to 80° C.

In a feed vessel a monomer emulsion was prepared from the following components with stirring (feed stream 1):

| Amount | Component |
| --- | --- |
| 644.00 g | deionized water |
| 2.89 g | sodium hydroxide |
| 15.00 g | 2-acrylamido-2-methyl-propanesulfonic acid |
| 2.50 g | ammonium persulfate |
| 7.14 g | emulsifier solution 1 |
| 14.29 g | emulsifier solution 2 |
| 500.00 g | methyl methacrylate |
| 500.00 g | butyl acrylate |

In a further feed vessel an aqueous initiator solution was prepared from the following components (feed stream 2):

| Amount | Component |
| --- | --- |
| 13.33 g | deionized water |
| 0.50 g | ammonium persulfate |

Reaction regime as in example 1.

The solids content of the aqueous polymer dispersion obtained was 47.0%.

B) Preparation of an Aqueous Comparative Dispersion

Emulsifier solution 2: 28% strength by weight aqueous solution of the sodium salt of a sulfuric monoester of an ethoxylated $C_{11}$ alcohol, average degree of ethoxylation approximately 7.

A polymerization reactor was charged with 475 g of deionized water and 25 g of emulsifier solution 2 and this initial charge was heated with stirring to 80° C.

In a feed vessel a monomer emulsion was prepared from the following components with stirring (feed stream 1):

| Amount | Component |
| --- | --- |
| 645.00 g | deionized water |
| 2.89 g | sodium hydroxide |
| 15.00 g | 2-acrylamido-2-methyl-propanesulfonic acid |
| 2.50 g | ammonium persulfate |
| 17.86 g | emulsifier solution 2 |
| 500.00 g | methyl methacrylate |
| 500.00 g | butyl acrylate |

In a further feed vessel an aqueous initiator solution was prepared from the following components (feed stream 2):

| Amount | Component |
| --- | --- |
| 13.33 g | deionized water |
| 0.50 g | ammonium persulfate |

The initial charge heated at 80° C. in the polymerization reactor was admixed in succession and in one portion in each case with 60.00 g of feed stream 1 and all of feed stream 2 and this mixture was polymerized at 80° C. for 15 minutes. Thereafter the remainder of feed stream 1 was metered continuously into the reactor over the course of 180 minutes at a constant 80° C. Finally polymerization was continued at 80° C. for 60 minutes and the batch was then cooled to 25° C.

The solids content of the aqueous polymer dispersion obtained was 47.0%.

C) Preparation of the Clear Varnishes

The aqueous polymer dispersions of examples 1-5, prior to use as clear varnish, were modified as follows with additives and a film-forming assistant:

100 pbw of the dispersion of examples 1-5 were admixed with stirring with a mixture consisting of 3.5 pbw of butyl diglycol and 2 pbw of water.

Subsequently 0.1 pbw of the silicone defoamer Tego Foamex 825 was stirred into the resultant mixture. This procedure gave the clear varnishes K 1 to K 5 that were used, in accordance with the table below:

| Clear varnish | Dispersion used from |
| --- | --- |
| K 1 | Example 1 |
| K 2 | Example 2 |
| K 3 | Example 3 |
| K 4 | Example 4 |
| Comparative clear varnish K 5 | Comparative example 5 |

D) Production of the Test Specimens

The clear varnishes K 1 to K 5 as per C are applied to a colored cementitious slurry whose composition is as follows:

| Amount | Component |
| --- | --- |
| 25 pbw | Water |
| 30 pbw | Quartz sand F 35 ® (Quarzwerke Frechen, max. particle size 0.355 mm) |
| 50 pbw | Cement CEM 142.5 |
| 1 pbw | Bayferrox 960 ® |

To prepare the colored cementitious slurry, water is introduced and then the solid and already premixed ingredients are incorporated over 5 minutes using a mortar stirrer. The slurry thus prepared is then applied to a prewatered Eterplan slab, with a film thickness of 1 mm and an area of 20*20 cm² in each case. Immediately thereafter the sample specimens thus produced are coated by spraying with the clear varnishes K 1 to K 5 described under C. 3 g of each clear varnish are applied to the still wet, uncured sample specimens (25 g/m²) which are then dried in a drying oven for 16 h at 40° C. and 95% humidity.

E) Gloss Measurements

The degree of gloss of the surface of the sample specimens produced under D is measured, giving the following result as a function of the clear varnish used:

| Aqueous clear varnish as per C used | Degree of gloss (measurement angle 60°) |
|---|---|
| K 1 | 6.1 |
| K 2 | 1.7 |
| K 3 | 1.6 |
| K 4 | 1.2 |
| Comparative example K 5 | 0.6 |

What is claimed is:

1. A concrete molding coated with mineral coating composition comprising cement, wherein said cement slurry-coated concrete molding is coated with a transparent varnish, said transparent varnish comprising as binder an aqueous polymer dispersion comprising at least one anionic emulsifier containing at least one phosphate and/or phosphonate group.

2. The concrete molding as claimed in claim 1, wherein the anionic emulsifier is mono-, di-, or tri-esters of phosphoric acid with alcohols and phenols; mono-, di-, or tri-esters of phosphoric acid with adducts of alcohols and ethylene oxide, alcohols and propylene oxide, (alkyl)phenols and ethylene oxide, or (alkyl)phenols propylene oxide; sodium, potassium or, ammonium salts of said esters; or mixtures thereof.

3. The concrete molding as claimed in claim 2, wherein the anionic emulsifier is copolymerizable modified alcohol ether phosphates; alkali metal or ammonium salts of linear $C_8$-$C_{12}$ alkylphosphonic acids; alkali metal or ammonium salts of linear or branched $C_{10}$-$C_{18}$ alkyl polyglycol ether phosphates; alkylaryl polyglycol ether phosphates; alkali metal or ammonium salts of linear or branched $C_{10}$-$C_{18}$ alkylphosphoric monoesters and diesters; or mixtures thereof.

4. The concrete molding as claimed in claim 2, wherein the anionic emulsifier is selected from the group consisting of an ethylenically unsaturated ester of phosphoric acid with hydrocarbons, base-neutralized derivatives of said ethylenically unsaturated ester of phosphoric acid with hydrocarbons, and mixtures thereof.

5. The concrete molding as claimed in claim 1, wherein in addition to the anionic emulsifier containing at least one phosphate and/or phosphonate group there is, in combination, a further anionic emulsifier containing at least one sulfate or sulfonate group.

6. The concrete molding as claimed in claim 1, wherein the aqueous polymer dispersion comprises an emulsion polymer derived from a monomer mixture having the following composition:

i) from 85 to 99.8% by weight of acrylic esters with $C_1$ to $C_{12}$ alkanols, methacrylic esters with $C_1$ to $C_{12}$ alkanols and/or vinylaromatic monomers,
ii) from 0.2 to 5% by weight of copolymerizable carboxylic acids, copolymerizable carboxamides, copolymerizable phosphates and/or phosphonates, copolymerizable sulfates and/or copolymerizable sulfonic acids and salts thereof, and
iii) from 0 to 10% by weight of other monomers.

7. The concrete molding as claimed in claim 6, wherein the monomers i) are selected from the group consisting of acrylic esters of $C_1$ to $C_{12}$ monoalcohols, methacrylic esters of $C_1$ to $C_{12}$ monoalcohols, vinylaromatic monomers, and mixtures thereof.

8. The concrete molding as claimed in claim 7, wherein the monomers i) are a combination of one or more monomers selected from the group consisting of butyl acrylate, 2-ethylhexyl acrylate, and mixtures thereof, with one or more monomers selected from the group consisting of methyl methacrylate, cyclohexyl methacrylate, styrene, and mixtures thereof.

9. The concrete molding as claimed in claim 6, wherein the monomers ii) are selected from the group consisting of acrylic acid, methacrylic acid, itaconic acid, acrylamide, methacrylamide, sodium ethenesulfonate, sulfoalkyl (meth) acrylates, sulfoalkyl(meth)acrylamides and mixtures thereof.

10. The concrete molding as claimed in claim 6, wherein the monomers iii) are monomers containing keto groups.

11. The concrete molding as claimed in claim 10, wherein the monomers containing keto groups are admixed with polyfunctional carboxylic hydrazides containing at least two hydrazide groups.

12. The concrete molding as claimed in claim 10, wherein the monomers iii) are acetoacetoxy-containing monomers.

13. The concrete molding as claimed in claim 12, wherein the monomers iii) are selected from the group consisting of acetoacetoxyethyl methacrylate, acetoacetoxybutyl methacrylate, acrylamidomethylacetylacetone, vinyl acetoacetate, diacetoneacrylamide, diacetonemethacrylamide, and polymerizable derivatives of diacetone.

14. The concrete molding as claimed in claim 10, wherein the monomers iii) are selected from the group consisting of acetoacetoxy-containing monomers and polymerizable derivatives of diacetone.

15. The concrete molding as claimed in claim 14, wherein the monomers iii) are selected from the group consisting of acetoacetoxyethyl methacrylate, acetoacetoxybutyl methacrylate, acrylamidomethylacetylacetone, vinyl acetoacetate, diacetoneacrylamide, and diacetonemethacrylamide.

16. The concrete molding as claimed in claim 6, wherein the monomers iii) are selected from the group consisting of hydroxyalkyl (meth)acrylates, glycidyl (meth)acrylates, alkoxyvinylsilanes, (meth)acryloyloxyalkylsilanes, (meth) acryloyloxyalkyl phosphates, polymerizable ethyleneurea derivatives, and combinations thereof.

* * * * *